United States Patent [19]

Rosen et al.

[11] Patent Number: 5,452,378
[45] Date of Patent: * Sep. 19, 1995

[54] IMAGE DIGITIZER INCLUDING PIXEL ENGINE

[75] Inventors: B. Joshua Rosen, Westford; Eric C. Peters, Carlisle, both of Mass.

[73] Assignee: Avid Technology, Inc., Tewksbury, Mass.

[*] Notice: The portion of the term of this patent subsequent to May 30, 2011 has been disclaimed.

[21] Appl. No.: 234,263

[22] Filed: Apr. 28, 1994

Related U.S. Application Data

[63] Continuation of Ser. No. 807,433, Dec. 13, 1991, Pat. No. 5,309,528.

[51] Int. Cl.6 .................................................. G06K 7/00
[52] U.S. Cl. .................................... 382/312; 382/251; 358/445

[58] Field of Search ...................... 382/50, 58, 62, 63, 382/8; 358/443, 444, 445; 345/190; 395/163, 166

[56] References Cited

U.S. PATENT DOCUMENTS

| 4,545,068 | 10/1985 | Tabata et al. | 382/44 |
| 4,748,511 | 5/1988 | Nichols et al. | 382/56 |
| 4,975,960 | 12/1990 | Petajan | 382/2 |
| 5,309,528 | 5/1994 | Rosen et al. | 382/58 |

Primary Examiner—Joseph Mancuso
Assistant Examiner—Jon Chang
Attorney, Agent, or Firm—Wolf, Greenfield & Sacks

[57] ABSTRACT

An image digitizer including a pixel engine connected to both a video memory and a processor. The pixel engine is configured to enable pixels to be transferred out of memory or read into memory while bypassing the processor thereby allowing more efficient transfer of data into and out of the image digitizer.

10 Claims, 3 Drawing Sheets

IMAGE DIGITIZER INCLUDING PIXEL ENGINE

This application is a continuation of application Ser. No. 07/807,433, filed on Dec. 13, 1991, issued as U.S. Pat. No. 5,309,528 on May 3, 1994.

BACKGROUND OF THE INVENTION

This invention relates to hardware designs coupled with software-based algorithms for capture, compression, decompression, and playback of digital image sequences, particularly in an editing environment.

The idea of taking motion video, digitizing it, compressing the digital datastream, and storing it on some kind of media for later playback is not new. RCA's Sarnoff labs began working on this in the early days of the video disk, seeking to create a digital rather than an analog approach. This technology has since become known as Digital Video Interactive (DVI).

Another group, led by Phillips in Europe, has also worked on a digital motion video approach for a product they call CDI (Compact Disk Interactive). Both DVI and CDI seek to store motion video and sound on CD-ROM disks for playback in low cost players. In the case of DVI, the compression is done in batch mode, and takes a long time, but the playback hardware is low cost. CDI is less specific about the compression approach, and mainly provides a format for the data to be stored on the disk.

A few years ago, a standards-making body known as CCITT, based in France, working in conjunction with ISO, the International Standards Organization, created a working group to focus on image compression. This group, called the Joint Photographic Experts Group (JPEG) met for many years to determine the most effective way to compress digital images. They evaluated a wide range of compression schemes, including vector quantization (the technique used by DVI) and DCT (Discrete Cosine Transform). After exhaustive qualitative tests and careful study, the JPEG group picked the DCT approach, and also defined in detail the various ways this approach could be used for image compression. The group published a proposed ISO standard that is generally referred to as the JPEG standard. This standard is now in its final form, and is awaiting ratification by ISO, which is expected.

The JPEG standard has wide implications for image capture and storage, image transmission, and image playback. A color photograph can be compressed by 10 to 1 with virtually no visible loss of quality. Compression of 30 to 1 can be achieved with loss that is so minimal that most people cannot see the difference. Compression factors of 100 to 1 and more can be achieved while maintaining image quality acceptable for a wide range of purposes.

The creation of the JPEG standard has spurred a variety of important hardware developments. The DCT algorithm used by the JPEG standard is extremely complex. It requires converting an image from the spatial domain to the frequency domain, the quantization of the various frequency components, followed by Huffman coding of the resulting components. The conversion from spatial to frequency domain, the quantization, and the Huffman coding are all computationally intensive. Hardware vendors have responded by building specialized integrated circuits to implement the JPEG algorithm.

One vendor, C-Cube of San Jose, Calif., has created a JPEG chip (the CL550B) that not only implements the JPEG standard in hardware, but can process an image with a resolution of, for example, 720×488 pixels (CCIRR 601 video standard) in just 1/30th of a second. This means that the JPEG algorithm can be applied to a digitized video sequence, and the resulting compressed data can be stored for later playback. The same chip can be used to compress or decompress images or image sequences. The availability of this JPEG chip has spurred computer vendors and system integrators to design new products that incorporate the JPEG chip for motion video. However, the implementation of the chip in a hardware and software environment capable of processing images with a resolution of 640×480 pixels or greater at a rate of 30 frames per second in an editing environment introduces multiple problems.

Standard image digitizers which include analog-to-digital and digital-to-analog converters, a processor, and a video memory are not in themselves capable of operating at the speeds required for full resolution 30 frames per second transmission for all frame formats and modes of operation that an application may require. Thus, the image digitizer can be a bottleneck of a video capture and playback system. One problem is caused by trying to handle variable picture format, including variable frame size, pixel depth, and frame rate (for example, NTSC vs. PAL). Another problem comes about in trying to achieve sufficient throughput in high bandwidth situations. In image digitizers of standard architecture, a bottleneck is created when images of high frame size, pixel depth, and frame rate are processed. An attempt to handle alpha channel information further increases the problem. Other format changes, such as subsampling, also slow down the system by taxing the relatively slow processor. The present invention is a method of tapping the video memory of the image digitizer so that the processor can be bypassed during pixel input and output.

SUMMARY OF THE INVENTION

The apparatus and method of the invention facilitate the transfer of data before and after the data compression and decompression operations. It is made up of an image digitizer, an image compression processor, and a processor that links the image digitizer to the image compression processor in the following fashion: the link processor (henceforth the pixel engine) links to both the processor and the memory of the image digitizer, and through an interface to the compression processor. The pixel engine optimizes the transfer of data between the image digitizer and image compression processor, and the transfer of data between the compression processor and the image digitizer memory. The pixel engine optimizes the transfer of data by programmably combining groups of pixels to be fed into the compression processor.

DESCRIPTION OF THE PREFERRED EMBODIMENT

Figure 1:
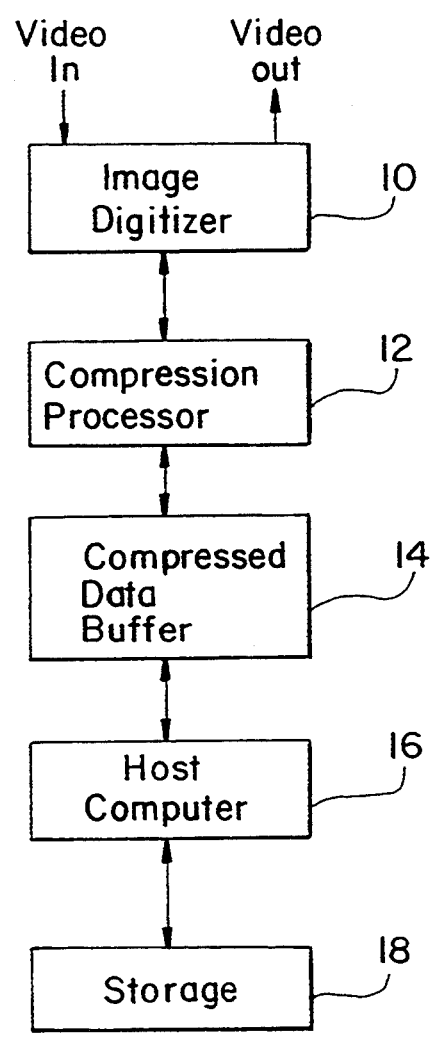
FIG. 1 is a block diagram of a video image capture and playback system implementing data compression.

A block diagram according to a preferred embodiment of a system for capture, compression, storage, decompression, and playback of images is illustrated in FIG. 1.

As shown, an image digitizer (frame grabber) 10, captures and digitizes the images from an analog source, such as videotape. Image digitizer 10 may be, for example, a TrueVision NuVista+board.

The compression processor 12 compresses the data according to a compression algorithm. Preferably, this algorithm is the JPEG algorithm, introduced above. As discussed above, C-Cube produces a compression processor (CL550B) based on the JPEG algorithm that is appropriate for use as compression processor 12. However, other embodiments are within the scope of the invention. Compression processor 12 may be a processor that implements the new MPEG (Motion Picture Experts Group) algorithm, or a processor that implements any of a variety of other image compression algorithms Ion own to those skilled in the art.

The compressed data from the processor 12 is preferably input to a compressed data buffer 14 which is interfaced to host computer 16 connected to disk 18. The compressed data buffer 14 preferably implements a DMA (digital multiple access) process in order to absorb speed differences between compression processor 12 and disk 18, and further to permit data transfer between processor 12 and disk 18 with a single pass through the CPU of host computer 16. The host computer 16 may be, for example, an Apple Macintosh.

As described above, the relatively slow image digitizer processors can create a bottleneck in image capture and playback systems. According to the invention, a "pixel engine" is configured to coordinate with the image digitizer to allow more efficient transfer of data into and out of the image digitizer.

Figure 2:
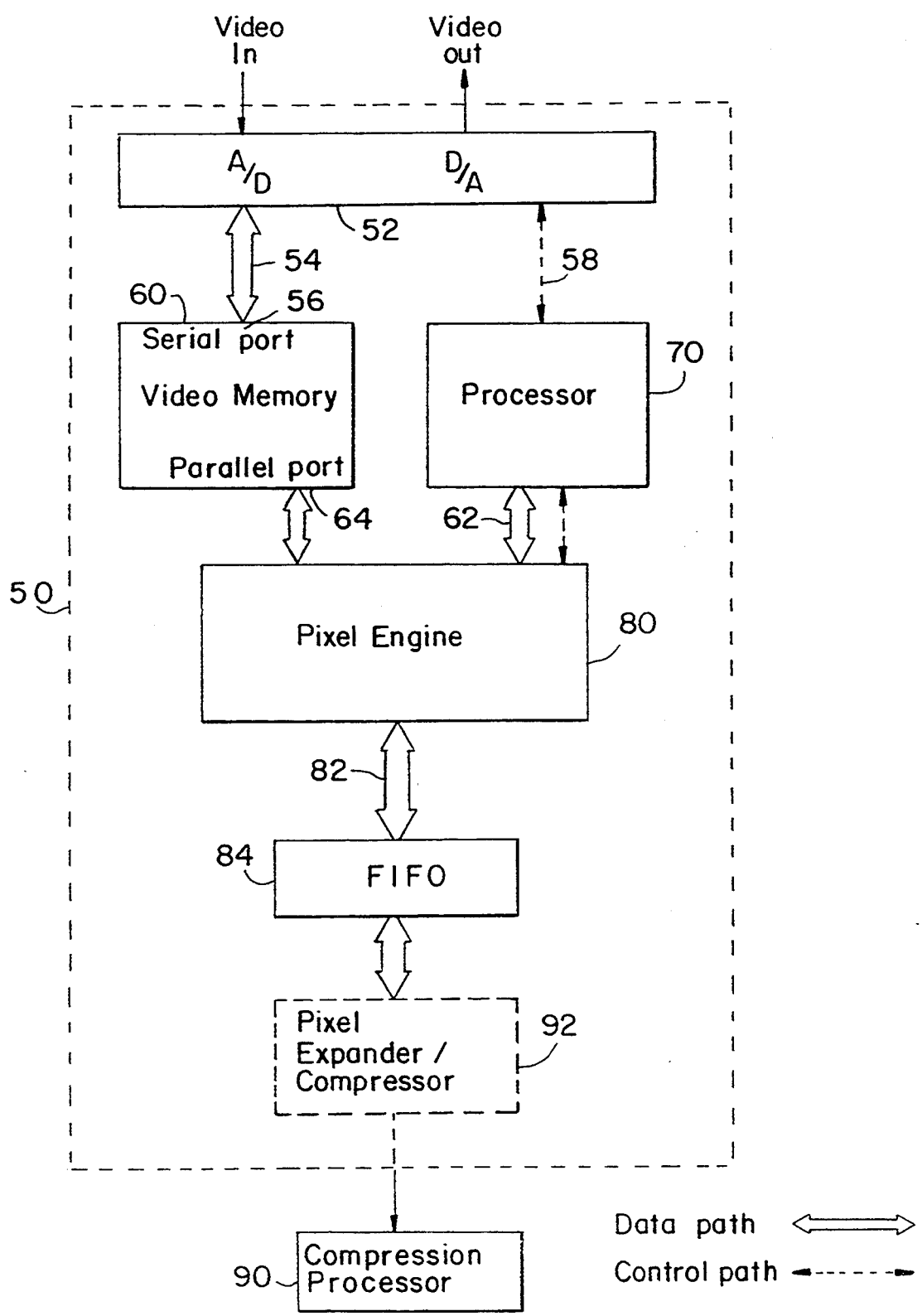
FIG. 2 is a schematic diagram of a pixel engine incorporated in an image digitizer according to one embodiment of the invention.

As illustrated in FIG. 2, in a standard image digitizer 50, analog-to-digital and digital-to-analog converters 52 are connected to video memory 60 via high bandwidth channel 54 and serial port 56, allowing digitized images to be input to and output from video memory 60 in real time. A processor 70 of the image digitizer 50, which is typically a general purpose CPU, is connected via control path 58 to analog-to-digital and digital-to-analog converters 52. In the NuVista+, the processor 70 is a TI 34010 processor.

A pixel engine 80 is inserted between the processor 70 and the video memory 60 of the image digitizer 50. It is connected via narrow path 62 to processor 70, and to video memory 60 at parallel port 64.

The pixel engine 80 is connected via path 82 (a fast 16 bit channel) to a bidirectional pixel FIFO 84, which inputs data to data compression processor 90.[1]

[1] The FIFO includes a feedback bit to the 34010 to tell it when there is empty space (during compression) or pixels (during playback) for the 34010 to process.

Importantly, the pixel engine has access to all pixels in the video memory. Therefore pixels can be transferred out of memory or read into memory while bypassing the processor.

According to the invention, the processor has the ability to access more information than is contained in the memory. In one embodiment, the image digitizer is a modified NuVista+board wherein the processor can address up to 16 MBytes, while the video memory comprises only 4 MBytes. The ability of the processor to access 4 times as many addresses as there are locations in memory is used to advantage as follows.

In a preferred embodiment, the address space of the processor is divided into 4 regions. If an address in the first region is pointed to by the processor, it accesses that location in video memory, as if the pixel engine were not even there. If it accesses locations in the second or third regions, it gets access to control functions and status registers of the pixel engine. Finally, if it accesses an address of the fourth region, herein denoted mirrored video memory, it causes the pixel engine to take the corresponding location in the real video memory and transfer it to the FIFO (or to take data coming in from the FIFO and store it in that location in video memory). Since the processor is completely programmable, image formats and modes of operation can be easily changed.

By using the processor for address generation in this way, the problems described above are solved. For example, the processor can be easily programmed to subsample, by simply telling it to point to every other pixel, for example. Other formatting variations are also dealt with by suitably programming the processor.

The bandwidth problem is reduced because the pixel path is kept out of the processor. Without the pixel engine at least two processor cycles are required for each input/output operation since the pixel taken from video memory is stored in a register in the processor before being sent to the FIFO. With the pixel engine, only one cycle is required.

The bandwidth problem can be further reduced as follows. In the embodiment described above, when one location in video memory is addressed, that location is really four pixels deep, because the memory is divided into four banks. Each memory cycle causes all four to operate, then selects the desired bank at the last moment. In normal operation, then, one address accesses four pixels. A selector pulls out the pixel you addressed. However, if you really want all four pixels, as in playback, you can configure the pixel engine to take all four pixels with a single access from the processor by changing the hardware. With this scheme, sufficient bandwidth becomes available for even full video.

In summary, the pixel engine programmably combines groups of pixels and transfers them to the FIFO (or vice versa).

Figure 3:
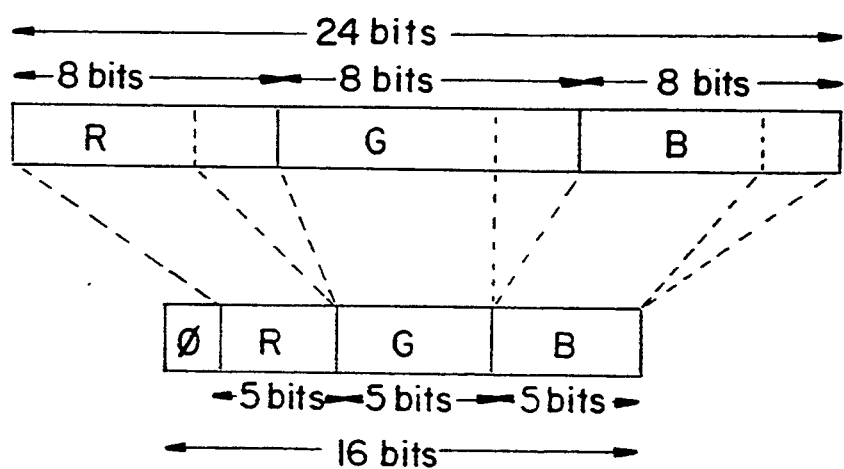
FIG. 3 is an illustration of a pixel engine bit map.

In one embodiment, the pixel image digitizer also includes a pixel expander/compressor 92. This may be necessary in certain applications. For example, the C-Cube chip described above always works with 24 bit color (and, optionally, the alpha channel). Thus, it may be necessary to adjust the number of bits in each pixel for compatibility. This is accomplished by the mapping shown in FIG. 3. When converting from 24 bits to 16 bits, each 8 bit color component (R, G and B) is shortened to 5 bits by discarding the least significant 3 bits in each case. In the opposite direction, each 5 bit quantity is expanded to 8 bits by appending 3 low order zero bits. There are other methods for expanding the number of bits which may result in better color range, but these methods are independent of this application. Note that in the 16 bit format the highest order bit is not used, and is given a zero value. This process is performed to save memory space and bandwidth, in order to make full resolution or video possible with existing, inexpensive memory components.

What is claimed is:

1. An image digitizer comprising:

video memory for storing digital pixel data;
a FIFO interface;
a processor having address space divided into a plurality of regions including a first region for identifying locations of pixels for being accessed by the processor for processing, and a second region for identifying locations of pixels to be transferred from the video memory to the FIFO interface;
a pixel engine intermediate the video memory and the processor so that data passing between the video memory and the processor through the pixel engine, wherein the pixel engine has means for enabling pixels to be transferred between the video memory and the FIFO interface while bypassing the processor, and, wherein, in response to an address to the first region, the pixel engine allows access from the processor to the video memory through the pixel engine.

2. The image digitizer of claim 1, further including a pixel expander/compressor connected to the FIFO interface.

3. The image digitizer of claim 1, wherein the address space of the processor includes a third region for accessing control functions and operating modes in the pixel engine.

4. The image digitizer of claim 1, wherein the processor is programmed to subsample pixels.

5. An image digitizer comprising:
a video memory for storing digital pixel data in memory locations;
a processor for processing pixel data;
an interface for storing data; and
a pixel engine connected between the video memory, the processor, and the interface, the pixel engine for transferring pixel data between the video memory and the interface;
wherein the processor has an address space divided into at least two blocks including
a first block for identifying pixels in a location in video memory for processing by the processor, and
a second block for identifying pixels in a location to be transferred between the video memory and the interface; and
wherein the pixel engine includes
means for determining whether a first or second block is being addressed by the processor,
means for connecting the processor to the video memory to allow the processor unimpeded access through the pixel engine to the pixels at the location in video memory in response to an address in the first block, and
means for transferring pixels between the video memory and the interface in response to an address in the second block, wherein the means for transferring transfers pixels independent of the processor.

6. The image digitizer of claim 5, wherein there is a plurality of pixels for each location in the video memory corresponding to a plurality of pixels, and wherein the pixel engine transfers the pixels in response to an address to the location in the second block.

7. The image digitizer of claim 6, wherein the processor has means for subsampling by selecting a group of locations at fixed intervals for transfer of the pixels corresponding to the respective locations.

8. The image digitizer of claim 5, wherein the means for transferring causes a plurality of pixels to be transferred in response to a single address and wherein the means for transferring transfers pixels while allowing the processor to address other memory locations.

9. The image digitizer of claim 5, wherein the pixel engine transfers a plurality of pixels in response to a single memory address from the processor in a single memory cycle.

10. An image digitizer comprising:
a video memory for storing digital pixel data at memory locations:
an interface;
a processor including
means for processing pixel data, and
means for addressing memory locations to identify selected pixel data;
a pixel engine connected between the video memory and the processor, and between the video memory and the interface, the pixel engine including
means for transfering pixel data representing a plurality of pixels between the video memory and the interface independent of the processor in response to a single first type of address to a particular location from the processor,
means for coupling the processor to the video memory to allow the means for processing to process the pixel data at a particular location in video memory in response to a second type of address from the processor,
means for determining whether the processor is addressing the particular memory location for processing or for transferring based on whether the address is of a first type or a second type.

* * * * *

UNITED STATES PATENT AND TRADEMARK OFFICE
CERTIFICATE OF CORRECTION

PATENT NO. : 5,452,378
DATED : September 19, 1995
INVENTOR(S) : B. Joshua Rosen and Eric C. Peters It is certified that error appears in the above-indentified patent and that said Letters Patent is hereby corrected as shown below:

On the title page under the item entitled "[*]Notice:" should read --The term of the patent shall not extend beyond the expiration date of Patent No: 5,309,528 --.

Signed and Sealed this

Sixteenth Day of January, 1996

Attest:

BRUCE LEHMAN

*Attesting Officer*   *Commissioner of Patents and Trademarks*